United States Patent

Shiu et al.

(10) Patent No.: US 10,108,256 B2
(45) Date of Patent: Oct. 23, 2018

(54) SYSTEMS AND METHODS FOR PROCESSING INCOMING EVENTS WHILE PERFORMING A VIRTUAL REALITY SESSION

(71) Applicant: MediaTek Inc., Hsin-Chu (TW)

(72) Inventors: Da-Shan Shiu, Taipei (TW); Shih-Jung Chuang, Taipei (TW)

(73) Assignee: MEDIATEK INC., Hsin-Chu (TW)

(*) Notice: Subject to any disclaimer, the term of this patent is extended or adjusted under 35 U.S.C. 154(b) by 519 days.

(21) Appl. No.: 14/657,022

(22) Filed: Mar. 13, 2015

(65) Prior Publication Data

US 2016/0124499 A1 May 5, 2016

Related U.S. Application Data

(60) Provisional application No. 62/072,615, filed on Oct. 30, 2014.

(51) Int. Cl.
G06F 3/048 (2013.01)
G06F 3/01 (2006.01)
(Continued)

(52) U.S. Cl.
CPC ............ G06F 3/011 (2013.01); G02B 27/017 (2013.01); G06T 13/40 (2013.01); H04M 1/7253 (2013.01); H04M 2250/52 (2013.01)

(58) Field of Classification Search
None
See application file for complete search history.

(56) References Cited

U.S. PATENT DOCUMENTS

2014/0085316 A1* 3/2014 Narayanan ............. H04N 7/157
345/501
2016/0063766 A1* 3/2016 Han ..................... G02B 27/017
345/633
(Continued)

FOREIGN PATENT DOCUMENTS

CN 103810353 A 5/2014
CN 103858073 A 6/2014
(Continued)

OTHER PUBLICATIONS

Yana Welinder, Facing Real-Time Identification in Mobile Apps & Wearable computers, Santa Clara Law Digital Commons, vol. 30, pp. 1-50 (Year: 2014).*

(Continued)

Primary Examiner — Tam T Tran
(74) Attorney, Agent, or Firm — McClure, Qualey & Rodack, LLP

(57) ABSTRACT

A virtual reality (VR) system including a virtual reality display and a virtual reality host is provided. The virtual reality display is arranged for displaying a virtual environment for a virtual reality user. The virtual reality host is arranged for performing a virtual reality session to generate the virtual environment using the virtual reality display and creating a virtual interface to sync and interact with a source unit, wherein when the source unit receives an incoming event, the virtual reality host receives a notification regarding the incoming event from the source unit and provides the notification to the virtual interface to generate an alert for the notification to the screen of the virtual reality display in the virtual environment for the virtual reality user.

17 Claims, 13 Drawing Sheets

(51) Int. Cl.
*G02B 27/01* (2006.01)
*G06T 13/40* (2011.01)
*H04M 1/725* (2006.01)

(56) References Cited

U.S. PATENT DOCUMENTS

| | | | | |
|---|---|---|---|---|
| 2016/0077337 A1* | 3/2016 | Raffle | ................... | G06F 3/013 |
| | | | | 345/156 |
| 2017/0003931 A1* | 1/2017 | Dvortsov | ................ | G11B 27/11 |
| 2017/0192620 A1* | 7/2017 | Kim | ..................... | G06F 3/0481 |

FOREIGN PATENT DOCUMENTS

| | | |
|---|---|---|
| CN | 103946732 A | 7/2014 |
| CN | 103970208 A | 8/2014 |
| JP | 2009-222774 A | 10/2009 |

OTHER PUBLICATIONS

Julie Carmigniani et al., Augmented reality technologies systems and applications, Springer Science & Business Media, Edition or vol. 51, pp. 341-377 (Year: 2011).*

* cited by examiner

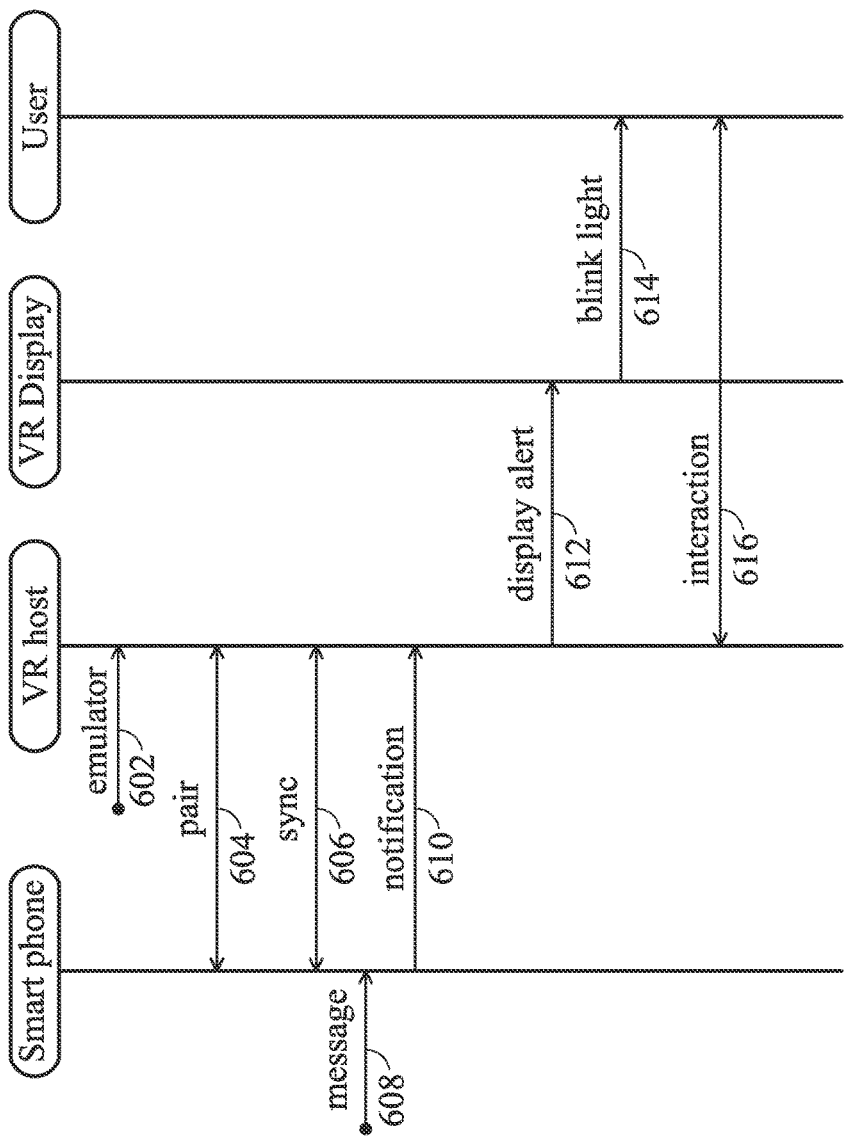

US 10,108,256 B2

SYSTEMS AND METHODS FOR PROCESSING INCOMING EVENTS WHILE PERFORMING A VIRTUAL REALITY SESSION

CROSS REFERENCE TO RELATED APPLICATIONS

This application claims priority of U.S. Provisional Application No. 62/072,615, filed on Oct. 30, 2014, and the entirety of which is incorporated by reference herein.

BACKGROUND OF THE INVENTION

Field of the Invention

The disclosure relates generally to mobile communications and, more particularly, to systems and methods for processing incoming events while performing a virtual reality session.

Description of the Related Art

With the development of computer technology, applications of Virtual Reality have become more and more popular. Virtual reality is an artificial environment that is created with software and presented to the user in such a way that the user suspends belief and accepts it as a real environment. For virtual reality application, a user may use a head-mounted display (HMD), which is a display device worn directly on the head of the user or as part of a helmet, as a display device in order to be immersed in a virtual reality (VR) session. The HMD is capable of receiving and rendering video output from the program running on the computer and/or on the game system. When the HMD is placed by a user on his head for performing a virtual reality session (e.g., a virtual reality game), it is either difficult or impossible to interact with this user's regular phone. When the phone of the user rings, one may have to remove his or her HMD to check on the alert screen of the phone to check the incoming events. This forcefully removes the user from the virtual reality world. Although it certainly would be fine if a legitimate incoming event comes to a phone to which the user must attend, many of the events can indeed be delayed until the virtual reality session finishes. Moreover, in certain virtual reality configurations, a converter kit may convert a smartphone into a virtual reality HMD. In such a case, if this phone is the user's primary daily phone, a downside of this configuration is that it further complicates how a user shall respond to this phone as an alert comes in.

It is therefore desirable to provide systems and methods for processing incoming event while performing a virtual reality session without needing to leave the virtual reality session.

BRIEF SUMMARY OF THE INVENTION

Virtual reality systems and methods for processing incoming event while performing a virtual reality session are provided.

An embodiment of a virtual reality (VR) system includes a virtual reality display and a virtual reality host. The virtual reality display is arranged for displaying a virtual environment for a virtual reality user. The virtual reality host is arranged for performing a virtual reality session to generate the virtual environment using the virtual reality display and creating a virtual interface to sync and interact with a source unit, wherein when the source unit receives an incoming event, the virtual reality host receives a notification regarding the incoming event from the source unit and provides the notification to the virtual interface to generate an alert for the notification to the screen of the virtual reality display in the virtual environment for the virtual reality user.

In another embodiment, a method for processing incoming events is provided. The method for processing incoming events includes the steps of: using a virtual reality module, performing a virtual reality session to generate a virtual environment on a virtual reality display and creating a virtual interface to sync and interact with a source unit in a virtual reality host; receiving, by the virtual reality host, a notification regarding an incoming event from a source unit via a wireless transmission; and transmitting, by the virtual reality host, the notification to the virtual interface to provide an alert for the notification to the screen of the virtual reality display within the virtual environment for the virtual reality user.

Another embodiment of a mobile device includes a wireless communication unit, a touch panel and a processing unit. The wireless communication unit is configured to sync and interact with a virtual interface in a virtual reality host. Upon receiving an incoming event, the processing unit transmits a notification regarding the incoming event to the virtual host via the wireless communication unit to enable the virtual reality host to provide the notification to the virtual interface so as to generate an alert for the notification into the virtual environment for the virtual reality user.

Another embodiment of a mobile device includes a wireless communication unit, a touch panel and a processing unit. The processing unit provides a virtual reality (VR) module to perform a virtual reality session to generate a virtual environment on the touch panel and creates a virtual interface, wherein upon receiving an incoming event, the processing unit provides a notification regarding the incoming event to the virtual interface so as to generate an alert for the notification into the virtual environment for the virtual reality user according to the notification.

Another embodiment of a wearable device includes a wireless communication unit, a touch panel and a processing unit. The wireless communication unit is configured to sync and interact with a virtual interface in a virtual reality host. Upon receiving an incoming event, the processing unit transmits a notification regarding the incoming event to the virtual host via the wireless communication unit to enable the virtual reality host to provide the notification to the virtual interface so as to generate an alert for the notification into the virtual environment for the virtual reality user.

Other aspects and features of the present invention will become apparent to those with ordinary skill in the art upon review of the following descriptions of specific embodiments of the virtual reality systems, and mobile devices for carrying out the incoming event processing methods.

BRIEF DESCRIPTION OF THE DRAWINGS

The invention will become more fully understood by referring to the following detailed description with reference to the accompanying drawings, wherein:

FIG. 6 is a schematic diagram illustrating a process for processing the incoming event according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Figure 1:
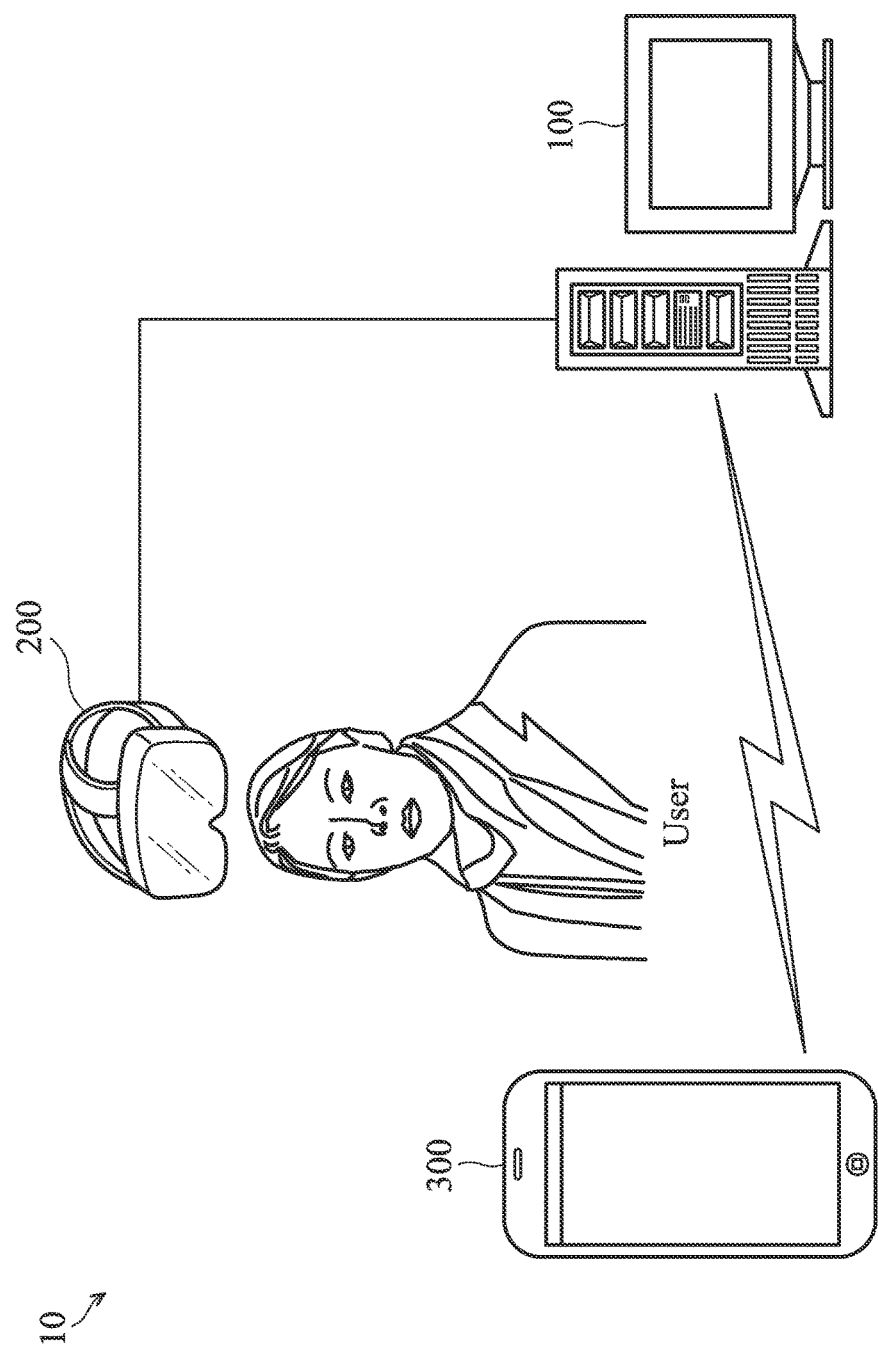
FIG. 1 is a schematic diagram of a virtual reality (VR) system according to an embodiment of the invention.

FIG. 1 is a schematic diagram of a virtual reality (VR) system according to an embodiment of the invention. The VR system 10 comprises a VR host 100, a VR display 200 and a source unit 300, wherein the source unit 300 may be a mobile phone, a smartphone, a Portable Media Player (PMP), a handheld gaming console, or a smart accessory (e.g., smart watch or smart glasses). In some embodiments, the VR host 100 may be a desktop Personal Computer (PC), a panel PC, a tablet computer, or a notebook, and the invention is not limited thereto.

Figure 2:
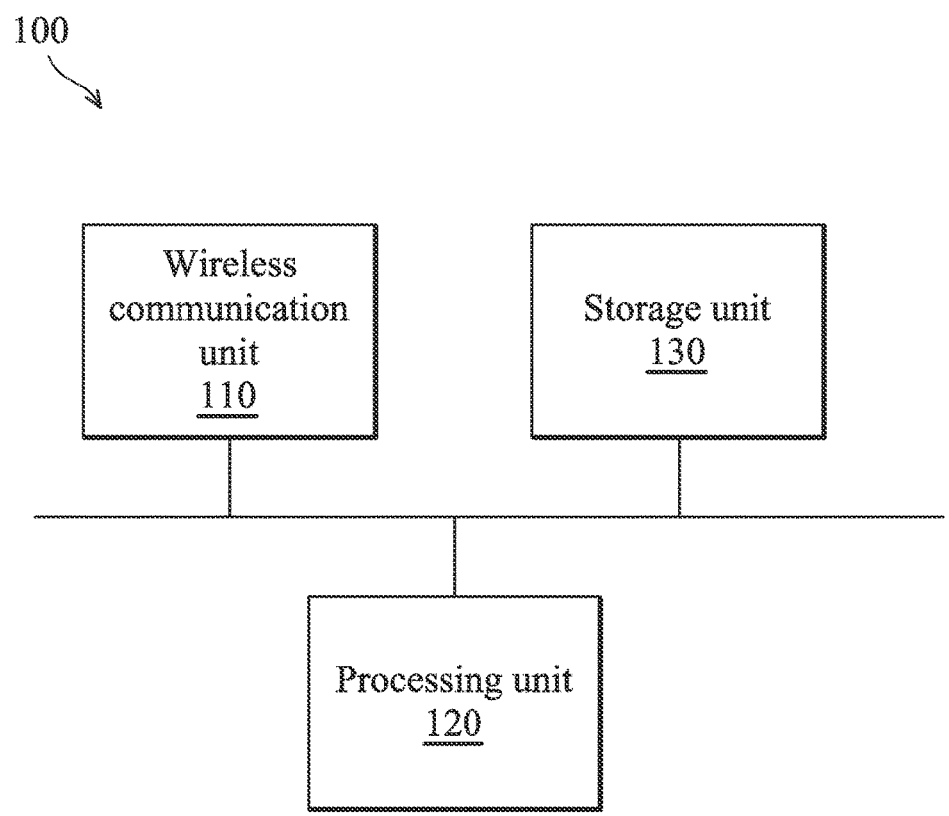
FIG. 2 is a block diagram illustrating the functional units of the virtual reality host according to an embodiment of the invention.

FIG. 2 is a block diagram illustrating the functional units of the VR host 100 according to an embodiment of the invention. The VR host 100 comprises a wireless communication unit 110, a processing unit 120, and a storage unit 130.

The VR host 100 may support various communications protocols, such as the code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, and Wi-MAX communication protocol, and a protocol for emails, instant messaging (IM), and/or a short message services (SMS), but the invention is not limited thereto. The wireless communication unit 110 is responsible for providing the function of wired or wireless network access, so that the VR host 100 may connect to one or more source units 300 or other devices. The wired network access may include an Ethernet connection, an Asymmetric Digital Subscriber Line (ADSL), a cable connection, or the like. The wireless network access may include a connection to a Wireless Local Area Network (WLAN), a WCDMA system, a Code Division Multiple Access 2000 (CDMA-2000) system network, a Time Division-Synchronous Code Division Multiple Access (TD-SCDMA) system, a Worldwide Interoperability for Microwave Access (WiMAX) system, a Long Term Evolution (LTE) system, an LTE Advanced (LTE-A) system, or a Time-Division LTE (TD-LTE) system. The wireless communication unit 110 may comprise a Radio Frequency (RF) unit and a Baseband unit. Specifically, the Baseband unit may contain multiple hardware devices to perform baseband signal processing, including ADC/DAC, gain adjusting, modulation/demodulation, encoding/decoding, and so on, while the RF unit may receive RF wireless signals, convert the received RF wireless signals to baseband signals, which are processed by the Baseband unit, or receive baseband signals from the baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless communications system, wherein the radio frequency may be 2.4 GHz or 5 GHz utilized in the Wireless-Fidelity (WiFi) technology, or may be 2.402~2.480 GHz utilized in the Bluetooth technology, or others depending on the wireless technology in use. To be more specific, the VR host 100 may connect to the source unit 300 via the wireless communication unit 110 for transmitting data to or receiving data from the source unit 300. For example, the VR host 100 may transmit a synchronization request to the source unit 300 to pair and sync with it and receive data from the source unit 300 via the wireless communication unit 110.

The processing unit 120 may include a processor. The processor may be a Central Processing Unit (CPU), Micro-Control Unit (MCU), Digital Signal Processor (DSP), or the like, which provides the function of data processing and computing. In this embodiment, the processing unit 120 may operate to perform a virtual reality session to provide visual information depicting a virtual environment, such that the VR user of the VR host 100 can interact through the virtual environment. Moreover, the processing unit 120 can operate to support communications or the delivery of information that is related to incoming events detected in the source unit 300 through the virtual environment presented. For providing a virtual environment, the processing unit 120 of the VR host 100 can implement or provide a VR module. Generally, the VR module operates to present the virtual environment to the VR user who wears the VR display 200 (e.g., a dedicated head-mounted VR display (HMD) device) through the VR display 200. Moreover, the virtual environment can be controlled by the VR module. More particularly, the processing unit 120 may load and execute a series of instructions and/or program codes from the storage unit 130 to control the operation of the wireless communication unit 110 and the processing unit 120, and provide a VR module, perform a VR session to generate a virtual environment on the VR display 200 using the VR module and create a virtual interface to sync and interact with the source unit 300, for performing the method for processing the incoming events of the invention, including; receiving, by the VR host 100, a notification regarding an incoming event from the source unit 300 via a wireless transmission (e.g., via a Wi-Fi or Bluetooth communication) and providing, by the VR host 100, the notification to the VR host 100 to generate an alert for the notification to the screen of the VR display 200 within the virtual environment for the VR user.

The storage unit 130 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as instructions, program codes, and input data from users. To be more specific, application codes stored in the storage unit 130 can be executed by the processing unit 120 to create the virtual interface component to sync and interact with the source unit 300 for performing the method for processing the incoming events of the invention.

Although not shown, the VR host 100 may further comprise other functional units, such as an Input/Output (I/O) device, e.g., a button, keyboard, mouse, etc., for controlling the VR session and the invention is not limited thereto.

The VR display 200 can be any display device capable of providing visual information depicting a virtual environment used in VR simulation and the VR user can wear the VR display 200 to join in the virtual environment. In some embodiments, the VR display 200 can be a dedicated HMD device. In some embodiments, the display of the mobile device (such as the screen of a smartphone) can also serve as the VR display 200, and the invention is not limited thereto.

Figure 3:
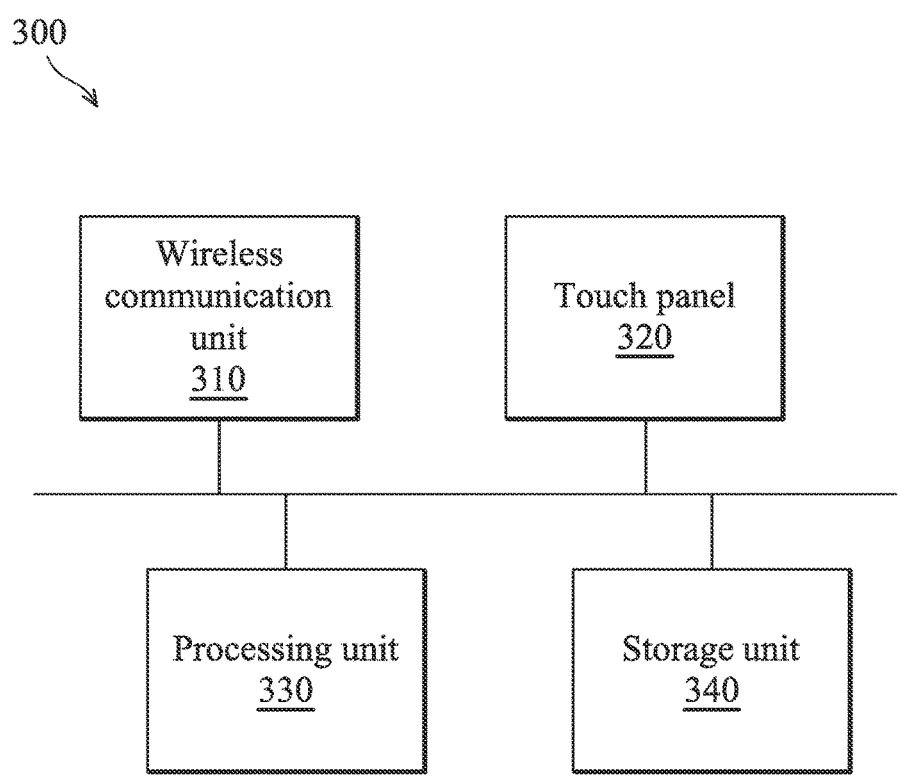
FIG. 3 is a block diagram illustrating the functional units of the source unit according to an embodiment of the invention.

FIG. 3 is a block diagram illustrating the functional units of the source unit 300 according to an embodiment of the invention. In some embodiments, the source unit 300 can be a mobile device, such as a PDA (Personal Digital Assistant), a smartphone, a mobile phone, an MID (Mobile Internet Device, MID), a laptop computer, a car computer, a digital camera, a multi-media player, a game device, a smart accessory (e.g., smart watch or smart glasses) or any other type of mobile computational device, however, it should be understood that the invention is not limited thereto. The source unit 300 comprises a wireless communication unit 310, a touch panel 320, a processing unit 330, and a storage unit 340. The wireless communication unit 310 is responsible for providing the function of wired or wireless network access, so that the source unit 300 may connect to the VR host 100. The wired network access may include an Ethernet connection, an Asymmetric Digital Subscriber Line (ADSL), a cable connection, or the like. The wireless network access may include a connection to a Wireless Local Area Network (WLAN), a WCDMA system, a Code Division Multiple Access 2000 (CDMA-2000) net system work, a Time Division-Synchronous Code Division Multiple Access (TD-SCDMA) system, a Worldwide Interoperability for Microwave Access (WiMAX) system, a Long Term Evolution (LTE) system, an LTE Advanced (LTE-A) system, or a Time-Division LTE (TD-LTE) system. The wireless communication unit 310 may comprise a Radio Frequency (RF) unit and a Baseband unit. Specifically, the Baseband unit may contain multiple hardware devices to perform baseband signal processing, including ADC/DAC, gain adjusting, modulation/demodulation, encoding/decoding, and so on, while the RF unit may receive RF wireless signals, convert the received RF wireless signals to baseband signals, which are processed by the Baseband unit, or receive baseband signals from the baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless communications system, wherein the radio frequency may be 2.4 GHz or 5 GHz utilized in the Wireless-Fidelity (WiFi) technology, or may be 2.402~2.480 GHz utilized in the Bluetooth technology, or others depending on the wireless technology in use. To be more specific, the source unit 300 may connect to the VR host 100 via the wireless communication unit 310 for transmitting data to or receiving data from the VR host 100. For example, the source unit 300 may transmit a notification to the VR host 100 when receiving an incoming event, such as an incoming call or any messages sent to the source units (e.g., short message service (SMS) message, multimedia messaging service (MMS) message, email message, social-network message and so on) via the wireless communication unit 310.

The touch panel 320 may include a display device, such as a Liquid-Crystal Display (LCD), a Light-Emitting Diode (LED), or an Electronic Paper Display (EPD), for providing the display function and detecting contact or proximity of objects (e.g., a finger or touch pen) thereon, thereby providing a touch-based user interface. The display device can display data, such as text, figures, interfaces, and/or information. It should be understood that, in some embodiments, the display device may be integrated with a touch-sensitive unit (not shown). The touch-sensitive unit has a touch-sensitive surface comprising sensors in at least one dimension to detect contact and movement of at least one object (input tool), such as a pen/stylus or finger near or on the touch-sensitive surface. Accordingly, users are able to input commands or signals via the screen of the display device.

The processing unit 330 may include a processor. The processor may be a Central Processing Unit (CPU), Micro-Control Unit (MCU), Digital Signal Processor (DSP), or the like, which provides the function of data processing and computing. More particularly, the processing unit 330 may load and execute a series of instructions and/or program codes from the storage unit 340 to control the operation of the wireless communication unit 310, the touch panel 320, and the processing unit 330, for performing the method for processing the incoming events of the invention, including synchronizing and interacting with the virtual interface generated in the VR host 100 and upon receiving an incoming event, transmitting a notification regarding the incoming event to the VR host 100 via the wireless communication unit 310 to enable the VR host 100 to provide the notification to the virtual interface so as to generate an alert for the notification into the virtual environment to notify the VR user.

The storage unit 340 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as instructions, program codes, and input data from users.

Although they are not shown, the source unit 300 may further comprise other functional units, such as an Input/Output (I/O) device, e.g., button, keyboard, or mouse, etc., and the invention is not limited thereto.

In one embodiment, the source unit 300 can be a mobile device (e.g., smartphone). In another embodiment, the source unit 300 can be a wearable device (e.g., smart watch or smart glasses).

Figure 4:
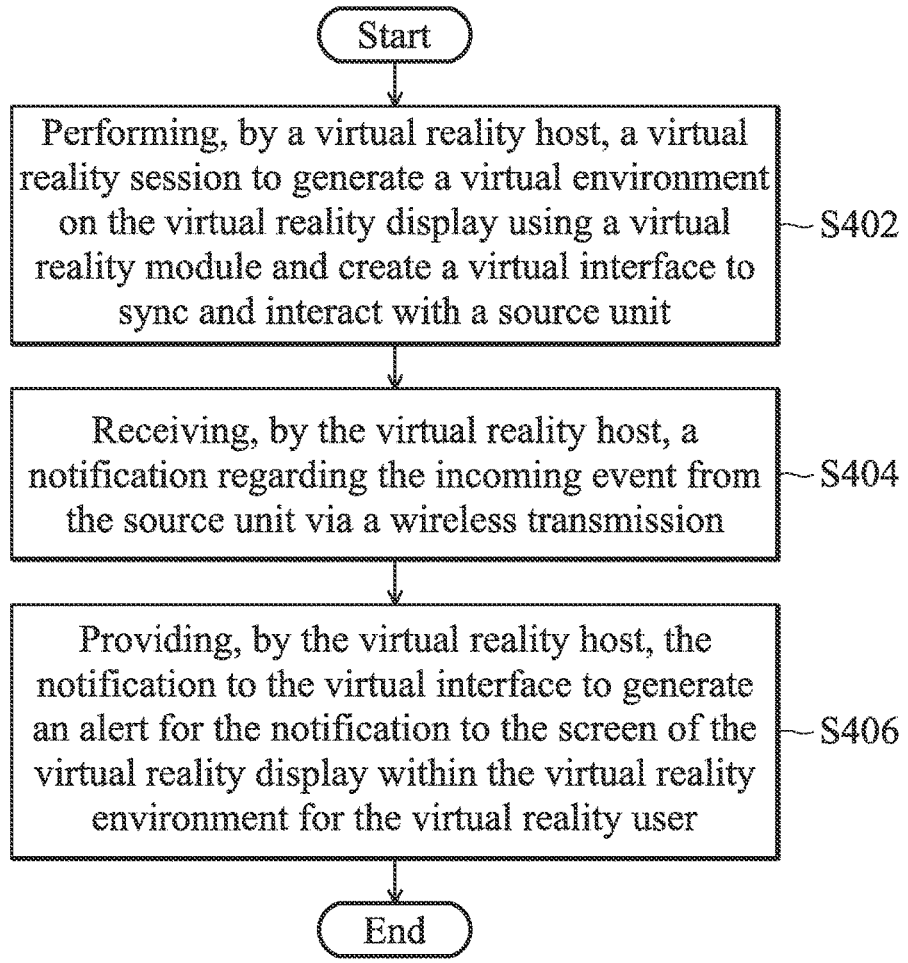
FIG. 4 is a flow chart illustrating a method for processing incoming events according to an embodiment of the invention.

FIG. 4 is a flow chart illustrating a method for processing incoming events according to an embodiment of the invention. The method can be applied to the VR host 100 and performed by the processing unit 120 as shown in FIG. 2. In this embodiment, the VR host 100 is implemented by a desktop personal computer (PC), the VR display 200 is implemented by a dedicated head-mounted display (HMD) and the source unit 300 is a smartphone, however, it should be understood that the invention is not limited thereto.

When a user wishes to perform a VR session, a VR module is provided and is used to perform a VR session to generate a virtual environment on the VR display 200 and create a virtual interface to sync and interact with the source unit 300 (e.g., a regular smartphone of the VR user) in the VR host 100 (step S402). For example, when a Bluetooth communication is selected as a protocol for the wireless transmission, the VR host 100 may use a suitable emulator to create a software application which is compatible with a wearable platform with the name "Virtual interface" on it. The source unit 300 can then detect and connect this application by selecting the name "Virtual interface" on the available Bluetooth device list and pair with this virtual interface. After the virtual interface and the source unit 300 have been successfully paired, the source unit 300 is able to sync with the virtual interface in the VR host 100.

Figure 5A:
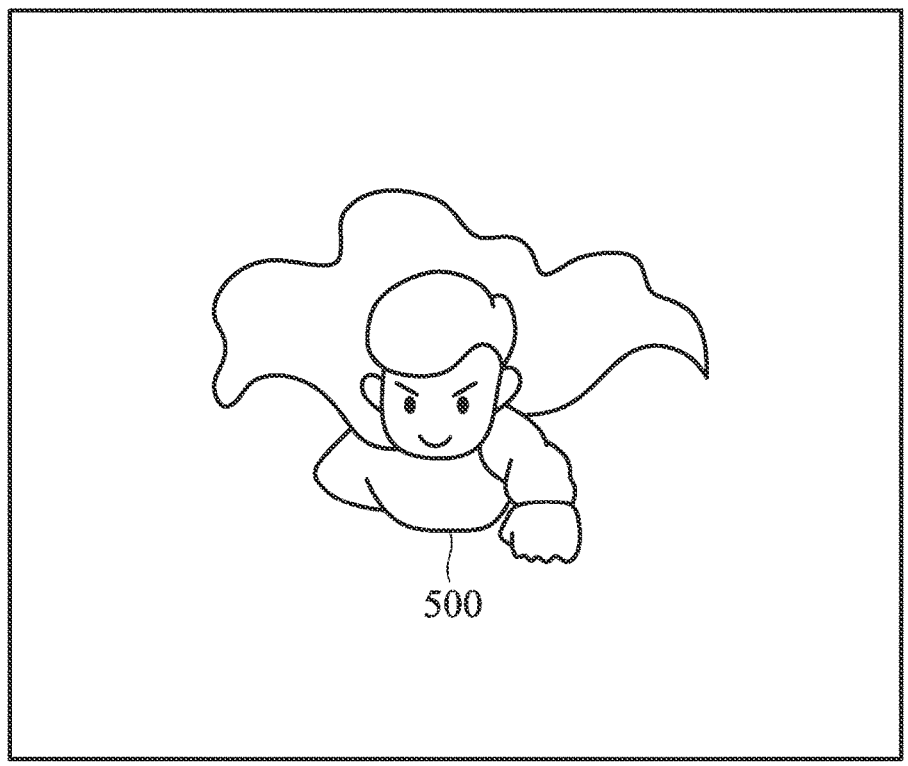
FIGS. 5A and 5B are schematic diagrams illustrating embodiments of the display of the virtual reality display in the virtual environment of the invention.
Figure 5B:
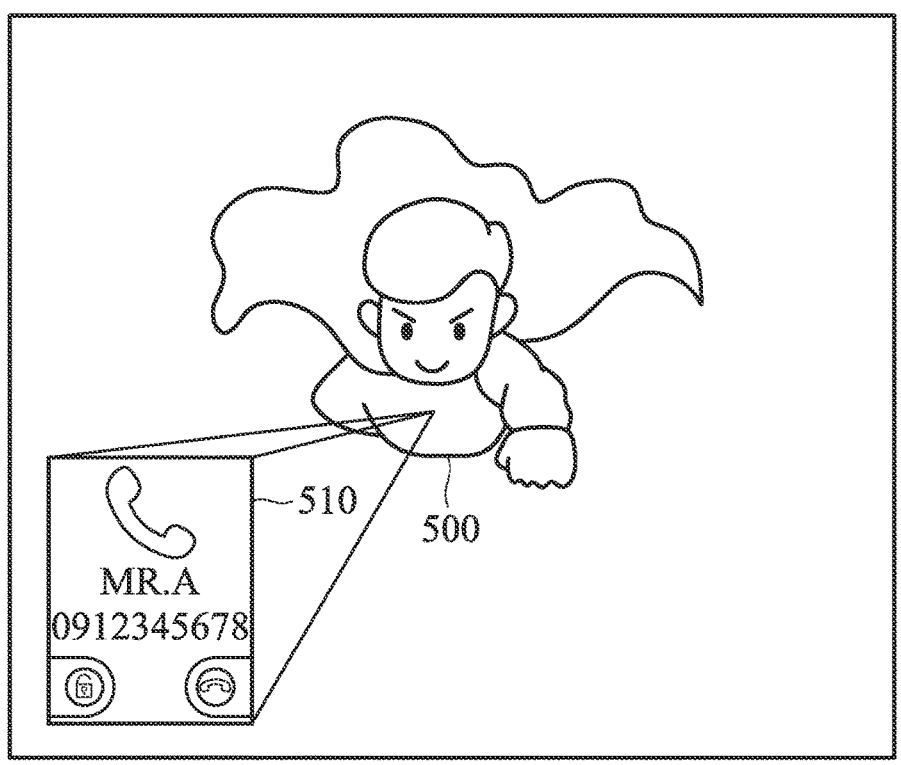

Thereafter, when an incoming event such as an incoming call or any notification that pops up on the source unit 300 is received by the source unit 300, the VR host 100 gets a notification simultaneously and thus a notification regarding the incoming event is received from the source unit 300 via a wireless transmission (e.g. via a WiFi-transmission or a Bluetooth transmission) by the VR host 100 (step S404). Upon receiving the notification regarding the incoming event from the source unit 300, the VR host 100 further provides the notification to the virtual interface to generate an alert for the notification to the screen of the VR display 200 within the virtual environment for the VR user (step S406). To be more specific, the VR host 100 will enable an alert (e.g., a blinking green light or a pop-up message) on the display of VR display 200 so that the VR user can get the most updated message within the virtual environment, without needing to leave the VR session. Then, the VR user can decide whether or not to switch to a user interface corresponding to the virtual interface within the virtual environment, wherein the user interface represents visual information corresponding to the incoming event. In some embodiments, the VR host 100 may further switch to display a user interface corresponding to the virtual interface in the virtual environment through the VR display 200 in response to a user selection. For example, if the incoming event is an incoming call from a friend A, the user interface represents visual information of "Call from A, answer?" into the display of the VR display 200 in the virtual environment. Please refer to FIGS. 5A-5B, which illustrate embodiments of the display of the VR display 200 in the virtual environment of the invention. As shown in FIG. 5A, the VR session displays a VR object 500 in the virtual environment. When an incoming call is received by the source unit 300, the virtual interface gets a notification simultaneously from the VR host 100 and thus the VR host 100 will be notified and will provide user interface 510 representing visual information regarding the incoming call on the VR object 500 as shown in FIG. 5B. Thus, the VR user can get the most updated message (e.g., there is an incoming call from Mr. A) within the virtual environment via the user interface 510, without needing to leave the VR session. The VR host 100 may further allow the VR user to process the incoming event via the user interface provided. The user may control and answer the call by operating the original input devices used in the VR session to input the user selection.

In some embodiments, after the processing of the incoming event is finished or the user determines not to answer the incoming call, the VR host 100 may terminate the displaying of the user interface and switch back to continue the VR session in the virtual environment through the VR display 200.

In some embodiments, the VR host 100 may further connect to a wearable device, which may include, but are not limited to, smart watches, smart bracelets, and smart rings, and configure the wearable device as a human interface device (HID) of the virtual interface for controlling the VR session in the virtual environment. To be more specific, following the same steps for synchronization between the virtual interface and the source unit 300 in step 204 as described above, the virtual interface can communicate with a wearable device and use it as a Human Interface Device (HID). After the wearable device has been successfully configured as the HID of the virtual interface, the user can control the incoming events in the virtual environment through predetermined gestures using the wearable device. In such a configuration, when the user wishes to process the incoming event, the user may send his instructions using a gesture on the wearable device. The VR host 100 may then receive the user's gesture from the wearable device and process the incoming event in the virtual environment in response to the user's gesture generated on the wearable device.

FIG. 6 is a schematic diagram illustrating a process for processing the incoming event according to an embodiment of the invention. In this embodiment, the VR host 100 is implemented by a PC, the VR display 200 is implemented by a dedicated HMD and the source unit 300 is a smartphone, however, it should be understood that the invention is not limited thereto.

When a user wishes to perform a VR session, a virtual interface is created using the emulator (step 602) to pair and sync with the smartphone by the PC. The smartphone can then detect and connect this application by selecting the name "Virtual interface" on the available Bluetooth device list and pair with this virtual interface in the PC (step 604). After the virtual interface and the smartphone have been successfully paired, the smartphone is able to sync with the PC (step 606). Thereafter, when an incoming message is received by the smartphone (step 608), the smartphone sends a notification regarding the incoming message to the PC via a wireless transmission (step 610). Upon receiving the notification regarding the incoming event from the smartphone, the PC further provides the notification to the virtual interface to display an alert corresponding to the notification to the screen of the HMD within the virtual environment for the VR user via the HMD (step 612) and the HMD may notify the user via a blinking light on the display of HMD (step 614). Then, the VR user may determine whether or not to switch to a user interface corresponding to the virtual interface within the virtual environment and may interact with the virtual interface for processing the message (step 616). The user may control and answer the call by operating the original input devices used in the VR session to input the user selection.

In addition, embodiments of the invention further provide a number of VR configurations for implementing the VR system 10. In some embodiments, the VR host 100 can be implemented by a desktop personal computer (PC) and the VR display 200 can be implemented by a dedicated head-mounted display (HMD). In some embodiments, the VR host 100 and the VR display 200 can be implemented by the same device, such as a mobile phone. For example, the processing unit of a mobile phone can serve as the VR host 100 and the display device of the mobile phone can serve as the VR display 200. In some embodiments, the VR host 100, the VR display 200 and the source unit 300 can be implemented by the same device. In other words, for example, in addition to being a source unit 300, the processing unit of a mobile phone can serve as the VR host 100 and the display device of the mobile phone can serve as the VR display 200. In some embodiments, the VR host 100 or the VR display 200 can be implemented by a mobile device. In other words, the processing unit of a mobile phone can serve as the VR host 100 or the display device of the mobile phone can serve as the VR display 200.

In some embodiments, the source unit 300 can be a mobile device with a wireless communication unit, a touch panel and a processing unit. The wireless communication unit is configured to sync and interact with a virtual interface in the VR host 100. Upon receiving an incoming event, the processing unit transmits a notification regarding the incoming event (e.g., an incoming call or message) to the VR host 100 via the wireless communication unit to enable the VR host 100 to provide a notification regarding the incoming event (e.g., an incoming call or message) to the virtual interface so as to generate an alert for the notification into the virtual environment for the VR user.

In some embodiments, the source unit 300 can be a wearable device with a wireless communication unit, a touch panel and a processing unit. The wireless communication unit is configured to sync and interact with a virtual interface in the VR host 100. Upon receiving an incoming event, the processing unit transmits a notification regarding the incoming event (e.g., an incoming call or message) to the VR host 100 via the wireless communication unit to enable the VR host 100 to provide a notification regarding the incoming event (e.g., an incoming call or message) to the virtual interface so as to generate an alert for the notification into the virtual environment for the VR user.

In some embodiments, the VR host 100 can be a mobile device with a wireless communication unit, a touch panel and a processing unit. The wireless communication unit is configured to sync with a source unit 300 (e.g., another mobile phone). The processing unit provides a VR module to perform a VR session to generate a virtual environment on the touch panel and creates a virtual interface to sync and interact with the source unit 300, wherein upon receiving an incoming event, the processing unit provides a notification regarding the incoming event to the virtual interface so as to generate an alert for the notification into the virtual environment for the VR user according to the notification through to the virtual interface.

For explanation, several embodiments of the VR configurations are illustrated in the following, but the invention is not limited thereto. It should be noted that, in the following embodiments, a primary smartphone is defined as the smartphone that a user uses as a daily phone, a secondary smartphone is defined as a spare smartphone, which is no longer used as a daily phone, and other wearable devices 400 may include, but are not limited to, smart watches, smart bracelets, and smart rings. Please refer to FIGS. 7A-7F, which illustrate embodiments of the VR configuration of the invention.

Figure 7A:
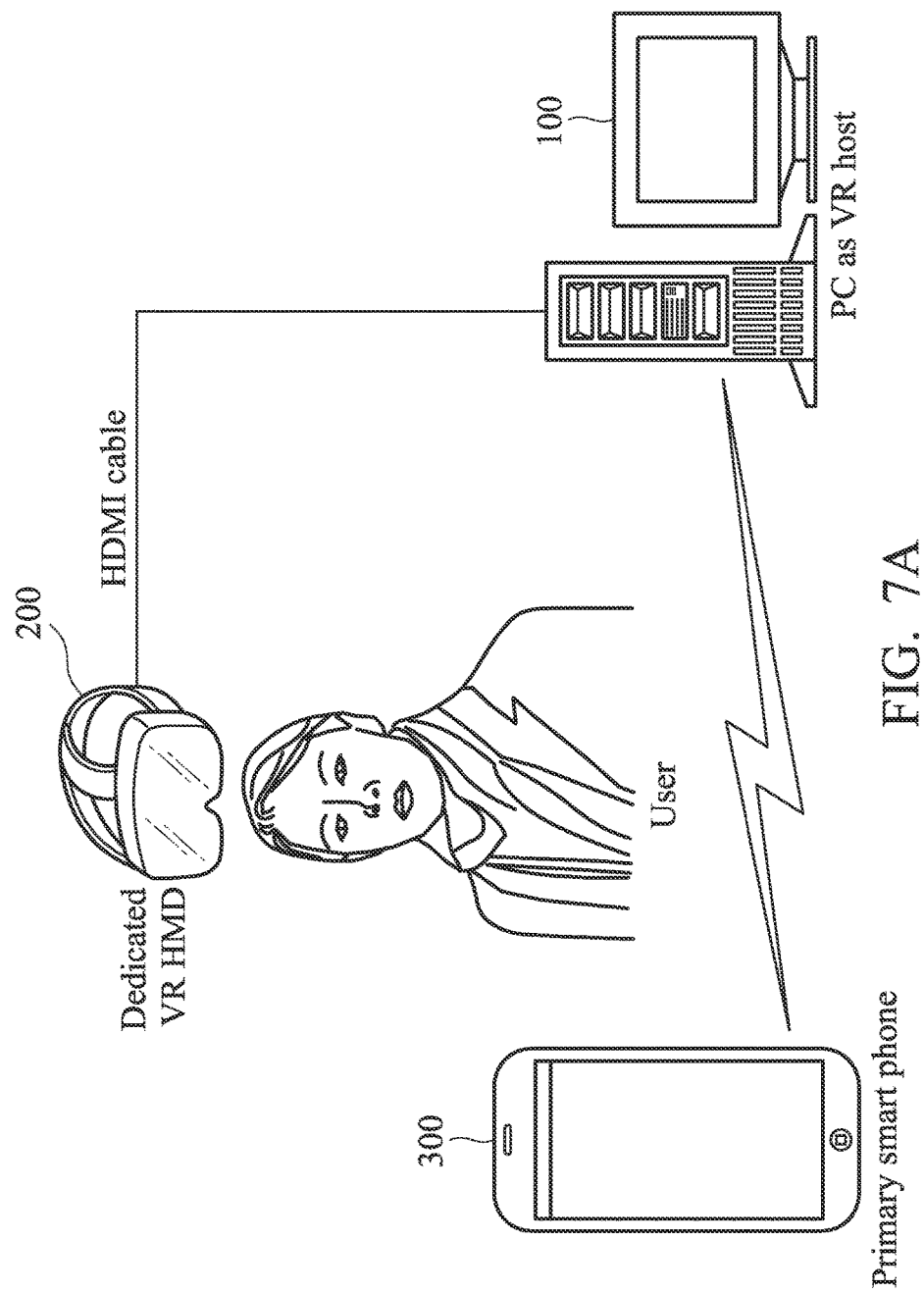
FIGS. 7A to 7F are schematic diagrams illustrating embodiments of the virtual reality configuration of the invention.

In the first VR configuration, the first VR configuration includes the PC as the VR host 100, a dedicated head-mounted VR display as the VR display 200, and the primary smartphone as the source unit 300, as shown in FIG. 7A. In one embodiment, when the VR host 100 creates the virtual world through the dedicated head-mounted VR display, the VR host 100 can create a virtual smart watch as the virtual interface, e.g. by emulation or by running a suitable software in a virtual machine. This virtual smart watch runs concurrently with the VR-related tasks in the VR host 100. The virtual world and the virtual smart watch can communicate within the same host. The virtual smart watch can be terminated when it's no longer needed.

In the second VR configuration, the second VR configuration includes the dedicated head-mounted VR display as the VR display 200, the PC as the VR host 100, the primary smartphone as the source unit 300 and other smart wearable devices 400 as the HIDs.

In the third VR configuration, the third VR configuration includes the primary smartphone leveraged as the VR display 200 and the PC as the VR host 100.

Figure 7B:
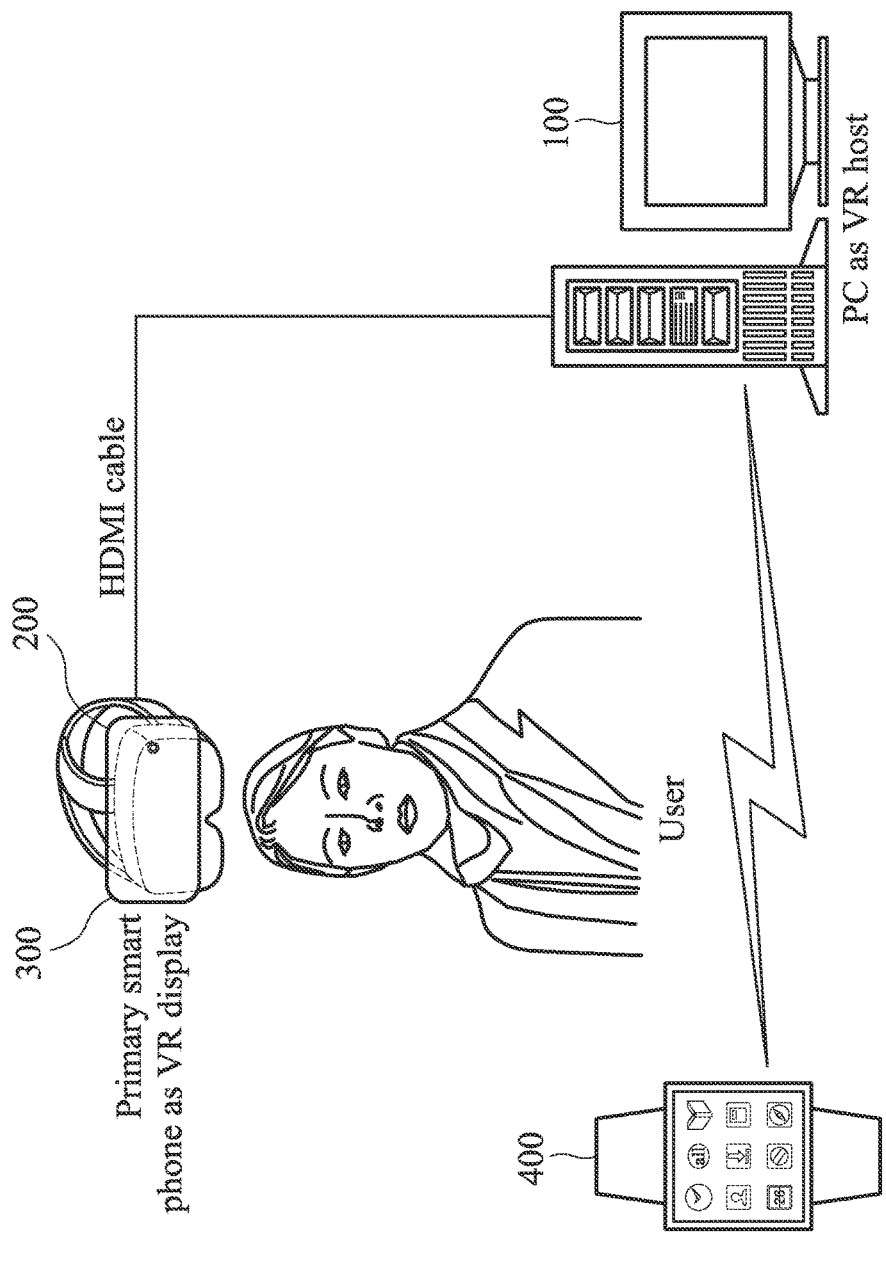

In the fourth VR configuration, the fourth VR configuration includes the primary smartphone leveraged as the VR display 200, the PC as the VR host 100 and other smart wearable devices 400 as the HIDs, as shown in FIG. 7B.

In the fifth VR configuration, the fifth VR configuration includes the primary smartphone leveraged as the VR display 200 and the VR host 100.

Figure 7C:
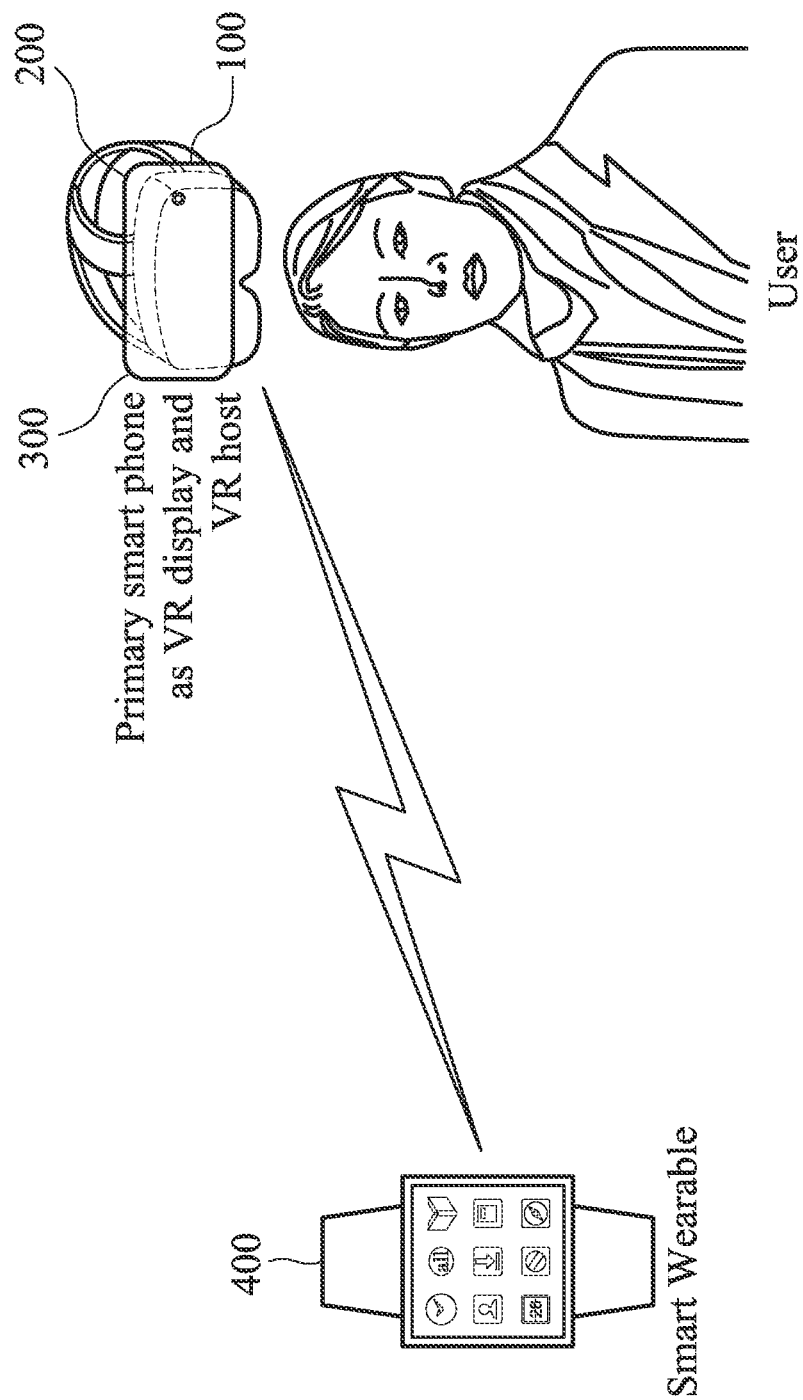

In the sixth VR configuration, the sixth VR configuration includes the primary smartphone leveraged as the VR display 200 and the VR host 100 and other smart wearable devices 400 as the HIDs, as shown in FIG. 7C.

In the seventh VR configuration, the seventh VR configuration includes the secondary smartphone leveraged as the VR display 200, the PC as the VR host 100 and the primary smartphone as the source unit 300.

Figure 7D:
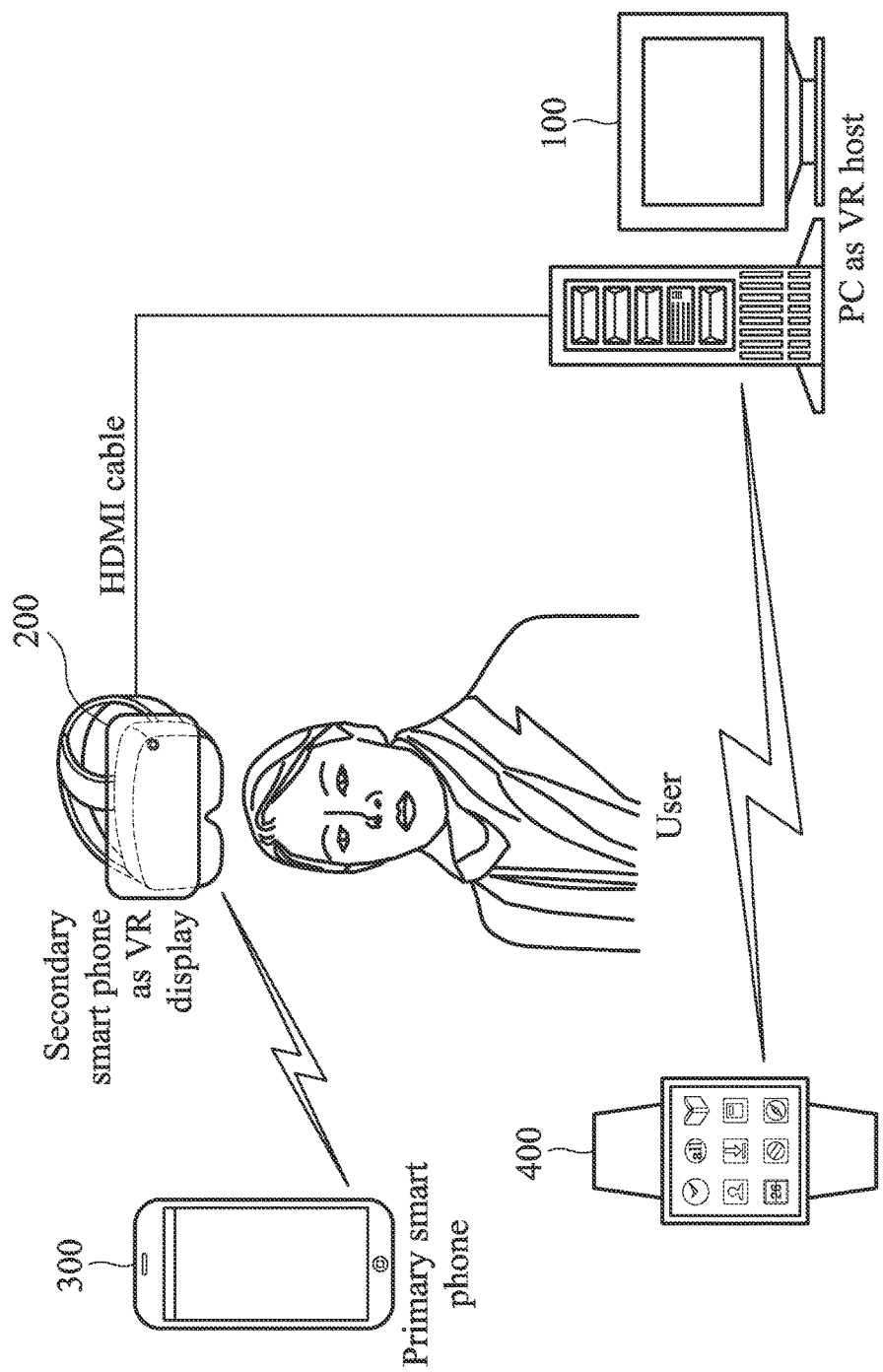

In the eighth VR configuration, the eighth VR configuration includes the secondary smartphone leveraged as the VR display 200, the PC as the VR host 100, the primary smartphone as the source unit 300 and other smart wearable devices 400 as the HIDs, as shown in FIG. 7D.

In the ninth VR configuration, the ninth VR configuration includes the secondary smartphone leveraged as the VR display 200 and the VR host 100 and the primary smartphone as the source unit 300.

In the tenth VR configuration, the tenth VR configuration includes the secondary smartphone leveraged as the VR display 200 and the VR host 100, the primary smartphone as the source unit 300 and other smart wearable devices 400 as the HIDs.

Figure 7E:
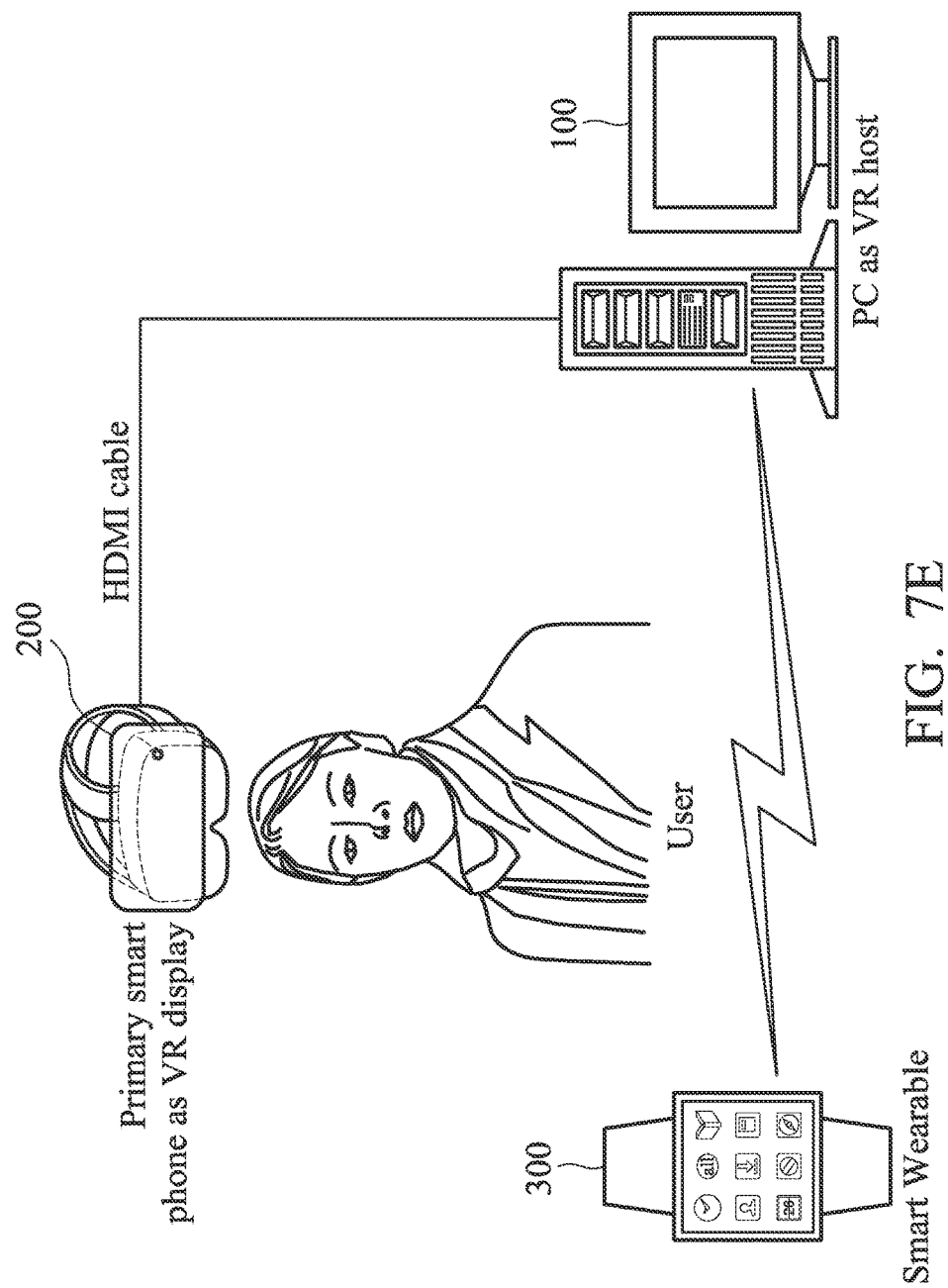

In the eleventh VR configuration, the eleventh VR configuration includes the primary smartphone leveraged as the VR display 200, the PC as the VR host 100 and the smart wearable device as the source unit 300, as shown in FIG. 7E.

Figure 7F:
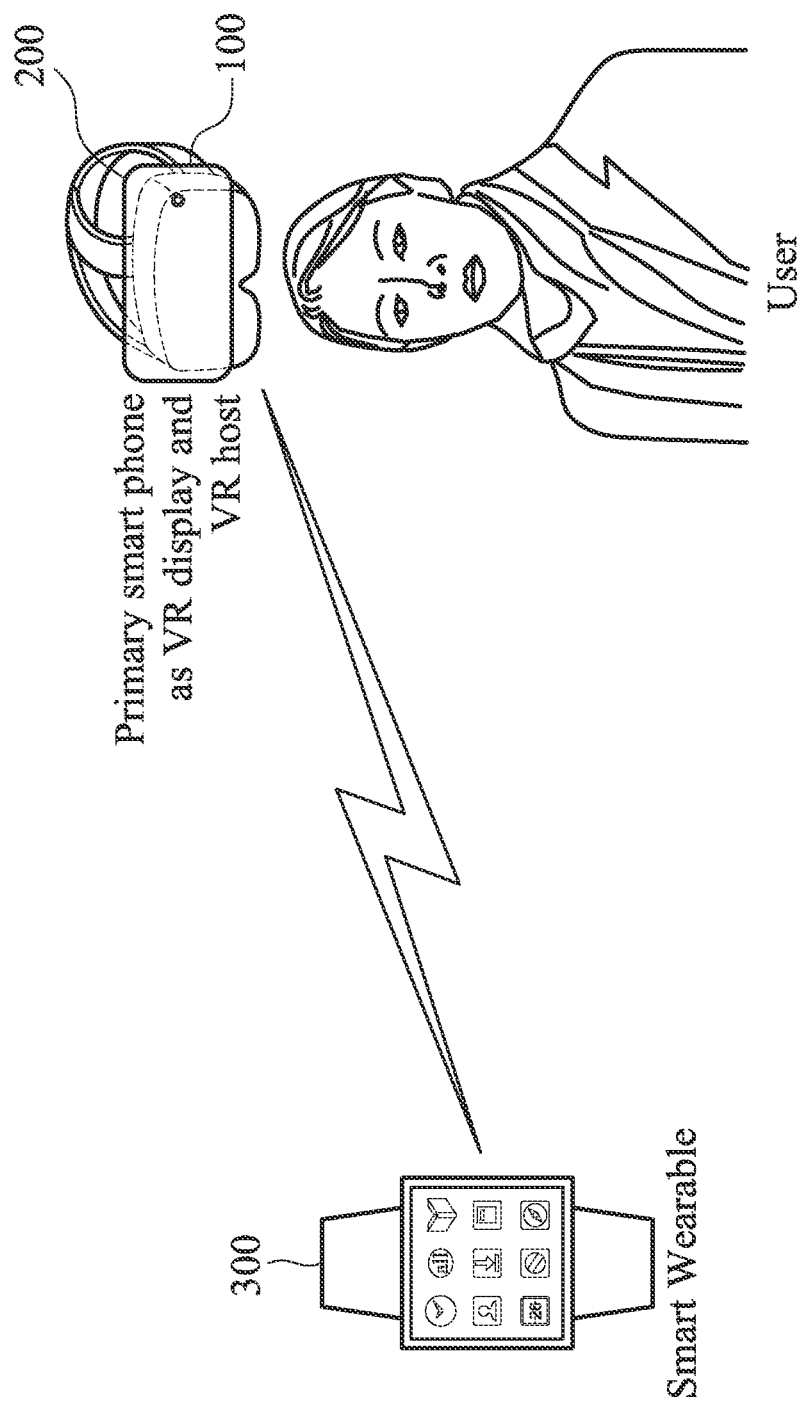

In the twelfth VR configuration, the twelfth VR configuration includes the primary smartphone leveraged as the VR display 200 and the VR host 100 and the smart wearable device as the source unit 300, as shown in FIG. 7F.

In another embodiment, a physical smart watch may create its virtual counterpart in the VR host 100, e.g. by loading a corresponding software image suitable for VR to a virtual machine in the VR host 100. In this situation, the primary smartphone (i.e., the source unit 300) is paired with the virtual smart watch, instead of the physical one. In order to assist the user to control the virtual smart watch, the physical smart watch can temporarily assume the role of a remote touch pad for the virtual one. When the VR session ends, the virtual smart watch is terminated, and the smartphone is paired with the physical watch once again.

In some embodiments, virtual network computing (VNC) can also be used to access the physical smart watch to mirror the virtual smart watch in the VR host. In this situation, the physical smart watch serves as a VNC server and the virtual smart watch serves as a VNC client in the VR host. Thus, the smartphone will pair directly with the physical smart watch.

Taking the first VR configuration as an example, when a user begins a VR session, a virtual interface (e.g., in the form of a virtual smart watch) is created in the VR host (e.g., the PC) and is synced and interactive with the source unit (e.g., the primary smartphone of the VR user). To the source unit, the virtual interface is no different from a real physical smart watch. In this embodiment, following the convention between the primary smartphone and the virtual reality host, when the primary smartphone needs to alert the VR user with a given event, it also passes the alert to the virtual reality host.

Thereafter, when the virtual reality host receives an event alert from the primary smartphone of the VR user, it can provide a notification in the virtual world through the virtual interface. In the virtual world, if the user wishes to, he or she may then summon up the virtual interface to quickly process the alerts. In this case, a VR HMD typically has high enough resolution to ensure that the display of the virtual interface can be shown to the user directly with clearly readable text and icons. Accordingly, the VR user can then interact with the virtual interface, e.g. to scroll down screens, with the input devices he or she is using to control the virtual world.

According to the embodiments of the invention, users are allowing to quickly and easily examine incoming alerts in the virtual environment without needing to leave the VR session, thus providing better user experience. Moreover, the embodiments of the invention can join the wearable device to control the VR session, thus providing easy and intuitive control in the VR session and increasing value and entertainment effect on VR systems.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A virtual reality (VR) system, comprising:
    a virtual reality display, displaying a virtual environment for a virtual reality user; and
    a virtual reality host, performing a virtual reality session to generate the virtual environment using the virtual reality display and creating a virtual interface to sync and interact with a source unit,
    wherein when the source unit receives an incoming event, the virtual reality host receives a notification regarding the incoming event from the source unit and provides the notification to the virtual interface to generate an alert for the notification to the screen of the virtual reality display in the virtual environment for the virtual reality user, and
    wherein the virtual reality host further connects to and configures a wearable device worn on the virtual reality user's hand as a human interface device (HID) of the virtual interface, and the virtual reality session is controlled by the HID in the virtual environment.

2. The virtual reality system of claim 1, wherein the virtual reality host further switches to display a user interface corresponding to the virtual interface in the virtual environment through the virtual reality display in response to a user selection, wherein the user interface represents visual information corresponding to the incoming event.

3. The virtual reality system of claim 2, wherein the virtual reality host further terminates the displaying of the user interface and switches back to continue the virtual reality session in the virtual environment through the virtual reality display.

4. The virtual reality system of claim 1, wherein the virtual reality host further receives a user gesture from the wearable device and processes the incoming event in the virtual environment in response to the user gesture generated on the wearable device.

5. The virtual reality system of claim 1, wherein the virtual reality host is implemented by a desktop personal computer and the virtual reality display is implemented by a dedicated head-mounted display (HMD).

6. The virtual reality system of claim 1, wherein the virtual reality host and the virtual reality display are implemented by the same device.

7. The virtual reality system of claim 1, wherein the virtual reality host and the virtual reality display are implemented by a mobile device.

8. The virtual reality system of claim 1, wherein the virtual reality host, the virtual reality display and the source unit are implemented by the same device.

9. The virtual reality system of claim 1, wherein the virtual reality host or the virtual reality display is implemented by a mobile device.

10. A method for processing incoming event, comprising:
    using a virtual reality module, performing a virtual reality session to generate a virtual environment on a virtual reality display and creating a virtual interface to sync and interact with a source unit in a virtual reality host;
    receiving, by the virtual reality host, a notification regarding an incoming event from the source unit via a wireless transmission;
    providing, by the virtual reality host, an alert for the notification to the screen of the virtual reality display within the virtual environment for the virtual reality user through the virtual interface; and
    connecting, by the virtual reality host, to and configuring a wearable device worn on the virtual reality user's hand as a human interface device (HID) of the virtual interface, wherein the virtual reality session is controlled by the HID in the virtual environment.

11. The method of claim 10, further comprising:
    switching, by the virtual reality host, to display a user interface corresponding to the virtual interface in the virtual environment through the virtual reality display in response to a user selection,
    wherein the user interface represents visual information corresponding to the incoming event.

12. The method of claim 11, further comprising:
    terminating, by the virtual reality host, the displaying of the user interface and switching back to continue the virtual reality session in the virtual environment through the virtual reality display.

13. The method of claim 10, further comprising:
    receiving, by the virtual reality host, a user gesture from the wearable device; and
    processing, by the virtual reality host, the incoming event in the virtual environment in response to the user gesture generated on the wearable device.

14. A mobile device, comprising:
    a wireless communication unit;
    a touch panel; and
    a processing unit coupled to the wireless communication unit and the touch panel, providing a virtual reality (VR) module to perform a virtual reality session to generate a virtual environment on the touch panel and creating a virtual interface,
    wherein upon receiving an incoming event, the processing unit provides a notification regarding the incoming event to the virtual interface to generate an alert for the notification into the virtual environment for the virtual reality user according to the notification, and
    wherein the processing unit further connects to and configures a wearable device worn on the virtual reality user's hand as a human interface device (HID) of the virtual interface, and the virtual reality session is controlled by the HID in the virtual environment.

15. The mobile device of claim 14, wherein the processing unit further switches to display a user interface corresponding to the virtual interface in the virtual environment through the touch panel in response to a user selection, wherein the user interface represents visual information corresponding to the incoming event.

16. The mobile device of claim 15, wherein the processing unit further terminates the displaying of the user interface and switches back to continue the virtual reality session in the virtual environment through the touch panel.

17. The mobile device of claim 14, wherein the processing unit further receives a user gesture from the wearable device and processes the incoming event in the virtual environment in response to the user gesture generated on the wearable device.

* * * * *